UNITED STATES PATENT OFFICE.

PAUL VOLKMANN, OF ELBERFELD, GERMANY, ASSIGNOR TO FARBENFABRIKEN VORM. FRIEDR. BAYER & CO., OF ELBERFELD, GERMANY, A CORPORATION OF GERMANY.

NAPHTHYLPYRAZOLONE SULFONIC ACID.

No. 910,437.  Specification of Letters Patent.  Patented Jan. 19, 1909.

Application filed June 17, 1908. Serial No. 439,073. (Specimens.)

*To all whom it may concern:*

Be it known that I, PAUL VOLKMANN, doctor of philosophy, chemist, citizen of the German Empire, residing at Elberfeld, Germany, Kingdom of Prussia, have invented new and useful Improvements in Naphthylpyrazolone Sulfonic Acids, of which the following is a specification.

My invention relates to the production of the hitherto unknown naphthylpyrazolone sulfonic acids having the following general formula:

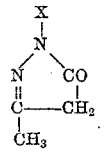

(X meaning the radical of naphthylamin sulfonic acids).

The process consists in condensing the naphthyl hydrazin sulfonic acids (obtainable by reducing the diazonaphthalin sulfonic acids) with aceto acetic ester. The new pyrazolone derivatives thus obtained are valuable intermediate compounds for the production of new azo dyestuffs which are obtained by combining diazo compounds with these products. They are grayish compounds soluble in hot water and form easily soluble, well crystallizing sodium salts. The dilute acid solutions of the new compounds yield on treatment with nitrous acid yellow nitroso compounds.

In order to carry out my new process I can *e. g.* proceed as follows, the parts being by weight: A solution of 48 parts of crystallized sodium acetate in 192 parts of water is added to a paste obtained by mixing 100 parts of 2 - naphthylhydrazin - 4.8 - disulfonic acid with 650 parts of water heated to 70° C. The stirring of the mixture which has to show a slightly acid reaction on congo paper is continued while 42 parts of aceto acetic ester are added to it. It is then heated to 80° C. and salt is added. The pyrazolone crystallizes in colorless needles which after cooling are filtered off and dried. The reaction which occurs is explained by the following formula:

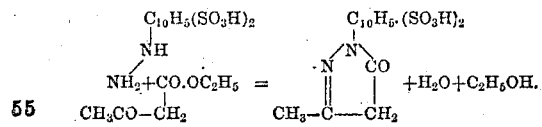

The 1 - beta - naphthyl - 4.8 - disulfonic acid - 3 - methyl - 5 - pyrazolone is in the shape of the free acid a grayish powder soluble in hot water. The dilute acid solution yields on treatment with nitrous acid a yellow nitroso compound.

The process is carried out in an analogous manner on preparing pyrazolones from other hydrazins of naphthylamin sulfonic acids *e. g.* of 1.4, 1.5, 1.6, 2.5, 2.6, or 2.8 - naphthylamin sulfonic acids or of 2.3.6, 2.5.7, 2.6.8 - naphthylamin disulfonic acids, 1-naphthylamin-3.5.7-trisulfonic acid etc.

Having now described my invention and in what manner the same is to be performed, what I claim as new and desire to secure by Letters Patent is:—

1. The herein-described new naphthylpyrazolone sulfonic acids having the formula:

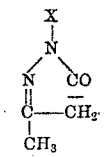

X meaning the radical of naphthylamin sulfonic acids which compounds are grayish powders soluble in hot water, forming easily soluble, well crystallizing sodium salts; and yielding yellow nitroso compounds on treatment of their dilute acid solutions with nitrous acid, substantially as described.

2. The herein - described new 1 - beta-naphthyl - 4.8 - disulfonic acid - 3 - methyl-5-pyrazolone of the formula:

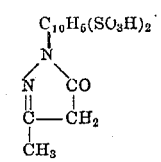

which is in the shape of the free acid a grayish crystalline powder soluble in water, and yielding a yellow nitroso compound by treating its dilute acid solution with nitrous acid, substantially as described.

In testimony whereof I have hereunto set my hand in the presence of two subscribing witnesses.

PAUL VOLKMANN. [L. S.]

Witnesses:
  OTTO KÖNIG,
  WM. WASHINGTON BOURSWICK.

It is hereby certified that in Letters Patent No. 910,437, granted January 19, 1909, upon the application of Paul Volkmann, of Elberfield, Germany, for an improvement in "Naphthylpyrazolone Sulfonic Acids," an error appears in the printed specification requiring correction, as follows: In line 75–80, page 1, the formula:

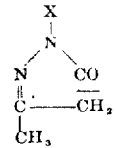    should read    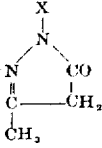

and that the said Letters Patent should be read with this correction therein that the same may conform to the record of the case in the Patent Office.

Signed and sealed this 16th day of March, A. D., 1909.

[SEAL.]

C. C. BILLINGS,
*Acting Commissioner of Patents.*